(12) United States Patent
Kang

(10) Patent No.: US 6,529,837 B1
(45) Date of Patent: Mar. 4, 2003

(54) APPARATUS AND METHOD FOR INSPECTING CELL DEFECT OF LIQUID CRYSTAL DISPLAY DEVICE

(75) Inventor: Dong Woo Kang, Pusan-shi (KR)

(73) Assignee: LG. Philips LCD Co., Ltd., Seoul (KR)

( * ) Notice: Subject to any disclaimer, the term of this patent is extended or adjusted under 35 U.S.C. 154(b) by 47 days.

(21) Appl. No.: 09/709,484

(22) Filed: Nov. 13, 2000

(30) Foreign Application Priority Data

Nov. 12, 1999 (KR) .......................................... 99-50238

(51) Int. Cl.⁷ ............................................. G01R 31/00
(52) U.S. Cl. ............................. 702/36; 702/81; 702/84; 324/770; 438/30
(58) Field of Search ............................ 702/36, 84, 81; 324/537, 770; 438/14–18, 30; 257/59, 72; 345/87

(56) References Cited

U.S. PATENT DOCUMENTS 5,235,272 A * 8/1993 Henley ........................ 324/537
5,459,410 A * 10/1995 Henley ........................ 324/537
5,459,594 A * 10/1995 Nakanishi et al. .......... 324/770

* cited by examiner

Primary Examiner—John Barlow
Assistant Examiner—Hien Vo
(74) Attorney, Agent, or Firm—McKenna Long & Aldridge LLP

(57) ABSTRACT

An inspecting apparatus and method for inspecting cell badness in a liquid crystal display device that is adaptive for shortening an inspection time and improving a work efficiency in a bad pixel inspecting work as well as improving a yield in a repairing work. In the apparatus, a pointing device freely moves a cursor emerging on the screen of the liquid crystal display panel in all the direction to acquire co-ordinate values of bad pixels. A file server stores the co-ordinate value of the bad pixels acquired by the pointing device. Accordingly, an co-ordinate value acquisition work of the bad pixels emerging on the liquid crystal display panel can be rapidly made to shorten an inspection time, and the acquired co-ordinate value can be automatically stored and automatically transmitted to a repairing device to improve a yield in the repair work.

13 Claims, 2 Drawing Sheets

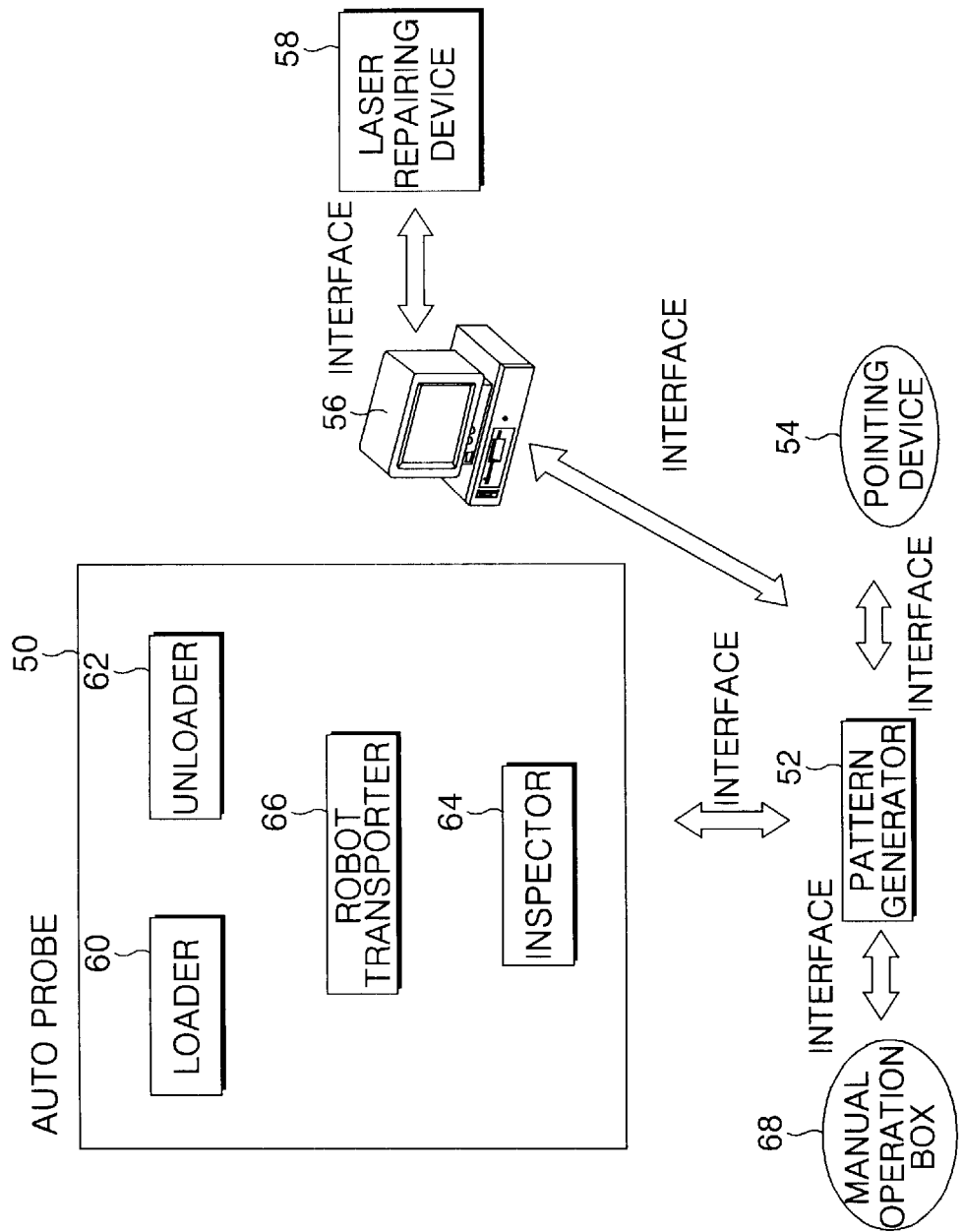

APPARATUS AND METHOD FOR INSPECTING CELL DEFECT OF LIQUID CRYSTAL DISPLAY DEVICE

BACKGROUND OF THE INVENTION

1. Field of the Invention

This invention relates to a liquid crystal display, and more particularly to an apparatus and method for inspecting a cell defect of a liquid crystal display device that is adaptive for shortening an inspection time and improving a working efficiency in a inspection work of a bad pixel as well as improving a yield in a repairing work.

2. Description of the Related Art

Generally, a liquid crystal display (LCD) is completed by carrying out various processes such as a process of fabricating the upper plate and the lower plate of a panel accompanying a formation process of a liquid crystal cell, a formation and rubbing process of an alignment film for aligning the liquid crystal, a process of bonding the upper plate to the lower plate, and a process of injecting and sealing the liquid crystal between the bonded upper plate and lower plate. The process of fabricating the lower plate includes a formation step of a thin film transistor (TFT) part and a formation step of other electrode part according to a work of coating an electrode material, a semiconductor layer and an insulating film on a substrate and etching the same. When the liquid crystal injection and sealing process has performed and then a polarizer is attached to both surfaces of the upper and lower plates to complete a liquid crystal display panel, a final inspection work is made.

In the final inspection process, test patterns are expressed on a screen of the completed liquid crystal display panel to probe the presence or absence of a bad pixel. If a bad pixel is found, a repairing work for the bad pixel is performed. The badness of the LCD panel includes point defects such as a poor color of each pixel cell, a bright point (i.e., always turned-on cell) and a dark point (i.e., always turned-off cell), etc. and line defects caused by a short between the adjacent data lines. Such badness is clearly come out to a worker's eye when the test patterns are expressed on the completed LCD panel. Then, the worker grasps a position of a bad pixel to perform a repairing work for the bad pixel position later.

FIG. 1 is a block diagram showing a configuration of a conventional cell badness inspecting apparatus for a liquid crystal display device. Referring to FIG. 1, the conventional inspecting apparatus includes an auto probe 20 for loading a LCD panel to be inspected and then inspecting the same, a pattern generator 22 for applying a test pattern signal to the LCD panel loaded on the auto probe 20, a manual operation box 24 for acquiring a co-ordinate value of a position at which a bad pixel is found in the inspecting process, and a laser repair device 26 for repairing the bad pixel of the LCD panel using a laser beam. The auto probe 20 includes a loader 28 for carrying a LCD panel to be inspected from the exterior thereof into the interior thereof, an unloader 30 for carrying an inspection-completed LCD from the auto probe 20 into the exterior thereof, an inspector for making an inspecting work for the loaded LCD panel, and a robot transporter 34 for carrying the LCD panel put on the loader 28 into the inspector 32 or carrying the LCD panel positioned at the inspector 32 into the unloader 30 after completion of the inspection. The pattern generator 22 is interfaced with the inspector 32 of the auto probe 20 to apply a test pattern signal to the inspector 32. Also, the pattern generator 22 is interfaced with the manual operation box 24 by means of a RS-232 port and the like to control an application of the test pattern signal by means of an operation button of the manual operation box 24. The manual operation box 24 is provided with a cursor operation button, thereby allowing a worker to control a position of the cursor appearing on the screen of the LCD panel upon inspection in the up, down, left and right direction.

Hereinafter, a process of inspecting and repairing pixel badness in a LCD panel using the conventional inspecting apparatus configured as mentioned above will be described. First, a LCD panel to be inspected at the loader 28 of the auto probe 20 is carried from the exterior into the interior of the auto probe 20. The LCD panel carried into the loader 28 is sent to the inspector by means of the robot transporter 34. When the LCD panel is safely loaded on the inspector 32 of the auto probe 20, the pattern generator 22 generates a test pattern signal in response to a control signal applied from the manual operation box 24 to apply the test pattern signal to the inspector 32 of the auto probe 20. Then, a test pattern is expressed on a screen of the LCD panel loaded on the inspector 32 of the auto probe 20. Thus, a worker observes this screen to inspect whether or not a bad pixel exists. At this time, a worker's eye senses pixel badness such as a poor color, a bright point, a dark point and a line defect, etc. At the same time, a cursor moved by an operation button of the manual operation box 24 is emerged on the screen of the LCD panel, and X-Y co-ordinates are displayed at the edge portion of the screen. The worker grasps a position of the bad pixel and then operates the cursor operation button of the manual operation box 24 to move a position of the cursor into the position of the bad pixel. The X-Y co-ordinate values of the bad pixel are displayed at the edge portion of the screen when the cursor has been moved to the bad pixel position. Then, the worker writes the co-ordinate values of the bad pixel displayed on the screen onto a work paper. Such a process is repeated until co-ordinate values of all the bad pixels have been known. After the co-ordinate values of all the pad pixels were known, the LCD panel loaded on the inspector 32 is transported into the unloader 30 by means of the robot transporter 34 and then is sent from the unloader 30 into the exterior of the auto probe 20. Subsequently, a LCD panel being subject to the next inspection is carried to the loader 28 of the auto probe 20. A LCD panel in which bad pixels are found in the inspecting process is sent to the laser-repairing device 26 to perform a repairing work for the bad pixels. At this time, a worker sees the work paper on which the co-ordinate values of the bad pixels found in the inspecting process has been written to perform a repairing work. In the laser repairing device 26, a transporting robot moves a laser beam generator into co-ordinates of the bad pixel written on the work paper to emit a laser beam to the corresponding bad pixel, thereby performing a repairing work of the liquid crystal cell. A general liquid crystal repairing method takes advantage of shorting TFT's of the liquid crystal cell by a laser beam to make a bright point of the corresponding cell or of opening the electrodes to make a dark point of the corresponding cell.

However, since the conventional LCD panel inspecting process must put the cursor operation button of the manual operation box 24 in every thing to move a position of the cursor into a position of the bad pixel so as to acquire co-ordinate values of the bad pixel as mentioned above, it has a problem in that a work time is lengthened and a work efficiency is deteriorated. Because the cursor operation button included in the existent manual operation box 24 makes a position control of the cursor in the up, down, left and right direction, a lot of button operation frequencies are required for moving the cursor into a position of the bad pixel and a work time is lengthened, to thereby deteriorate a work efficiency. Furthermore, the conventional inspecting process has a problem in that, since co-ordinate values of a bad pixel acquired in the above manner are written on a work paper in every thing by a worker to allow the worker to perform a repair work seeing the co-ordinate value data written on the work paper later rather than being automatically transmitted to the laser repairing device 26, a work efficiency is not only deteriorated, but also a yield in a repair work is deteriorated due to an error that may be generated upon the repair work.

SUMMARY OF THE INVENTION

Accordingly, it is an object of the present invention to provide an apparatus and method for inspecting a cell badness in a liquid crystal display device that is adaptive for shortening an inspection time and improving a work efficiency in a bad pixel inspecting work as well as improving a yield in a repairing work.

In order to achieve these and other objects of the invention, an inspecting apparatus for inspecting cell badness in a liquid crystal display device according to one aspect of the present invention includes pointing device moving a cursor emerging on the screen of the liquid crystal display panel in all the direction to acquire co-ordinate values of bad pixels; and data storage device storing the co-ordinate values of the bad pixels acquired by the pointing device.

A method of inspecting cell badness in a liquid crystal display device according to another aspect of the present invention includes the steps of applying a test pattern signal from a pattern generator on a screen of a liquid crystal display panel; moving a cursor emerging on the screen of the liquid crystal display panel using pointing device; acquiring co-ordinate values of the bad pixels using the pointing device; and transmitting the co-ordinate values of the bad pixels and the identification number data stored in data storage device to repairing device for repairing the liquid crystal display panel.

BRIEF DESCRIPTION OF THE DRAWINGS

These and other objects of the invention will be apparent from the following detailed description of the embodiments of the present invention with reference to the accompanying drawings, in which:

FIG. 2 is a block diagram showing a configuration of a conventional apparatus of inspecting cell badness in a liquid crystal display device according to an embodiment of the present invention.

DETAILED DESCRIPTION OF THE PREFERRED EMBODIMENT

Figure 1:
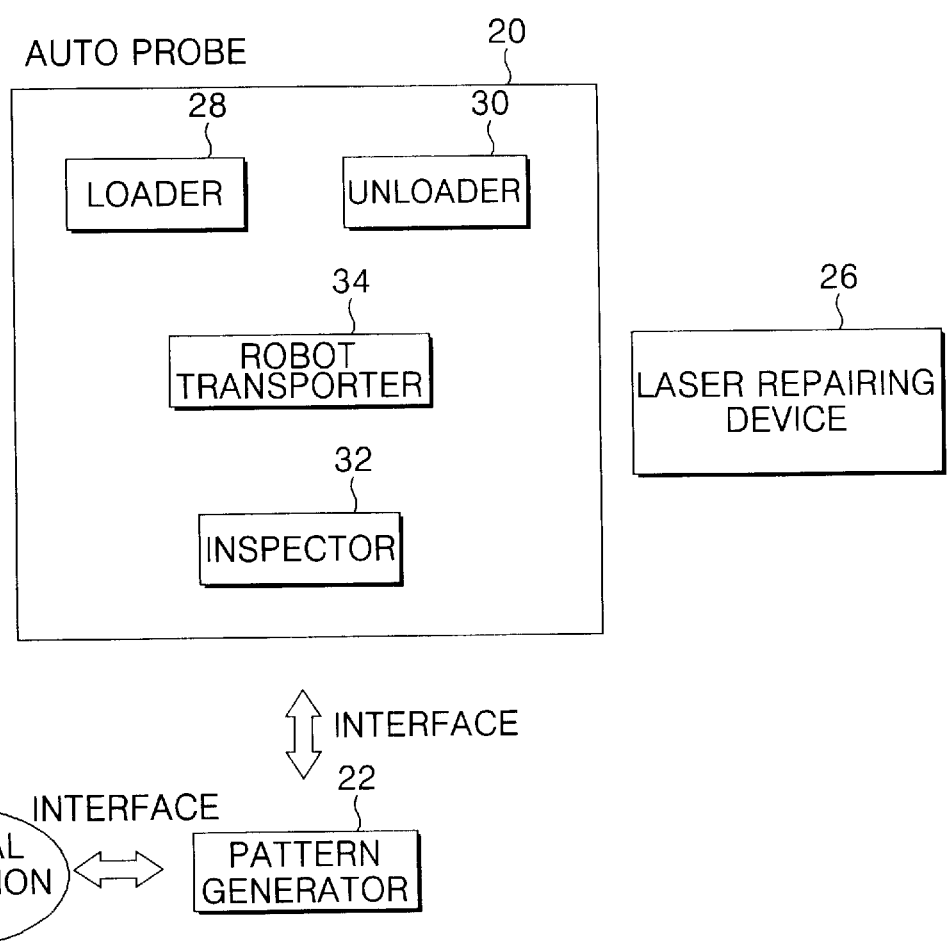
FIG. 1 is a block diagram showing a configuration of a conventional apparatus of inspecting cell badness in a liquid crystal display device.

Referring to FIG. 2, there is shown an inspecting apparatus for inspecting cell badness in a liquid crystal display device according to an embodiment of the present invention. The inspecting apparatus includes an auto probe 50 for loading a LCD panel to be inspected and then inspecting the same, a pattern generator 52 for applying a test pattern signal to the LCD panel loaded on the auto probe 50, a pointing device 54 for rapidly acquiring co-ordinate values of a position at which a bad pixel is found in the inspecting process, a file server 56 for storing the co-ordinate values of bad pixels acquired at the pointing device 54, and a laser repair device 58 for repairing the bad pixel of the LCD panel using a laser beam with the aid of the co-ordinate value of bad pixels applied automatically from the file server 56. In similarity to the conventional inspecting apparatus, the auto probe 50 includes a loader 60 for carrying a LCD panel to be inspected from the exterior thereof into the interior thereof, an unloader 62 for carrying an inspection-completed LCD from the auto probe 50 into the exterior thereof, an inspector 64 for making an inspecting work for the loaded LCD panel, and a robot transporter 66 for carrying the LCD panel put on the loader 60 into the inspector 64 or carrying the LCD panel positioned at the inspector 64 into the unloader 62 after completion of the inspection. The pattern generator 52 is interfaced with the inspector 64 of the auto probe 50 to apply a test pattern signal to the inspector 64. Also, the pattern generator 52 is interfaced with the pointing device 54 by means of a RS-232 port and the like to control an application of the test pattern signal by means of an operation button of the pointing device 54. The pointing device 54 is a device capable of freely operating a position of a cursor emerging on a screen of a LCD panel. For instance, the pointing device 54 is a mouse mounted in a general personal computer, which is a device of permitting a worker to rapidly move a cursor emerging on a screen of a LCD panel upon inspection of the LCD panel using the pointing device 54 in all the direction. The file server 56 is a personal computer for server, which is interfaced with the pointing device 54 interfacing the pattern generator 52. Co-ordinate values of a bad pixel in a LCD panel acquired by the pointing device 54 are automatically transmitted to be stored in the file server 56 as a data. The laser-repairing device 58 is interfaced with the file server 56 to automatically transmit the data stored in the file server 56 to the laser-repairing device 58 after completing an inspection for the LCD panel, thereby performing an automatic repair work.

Hereinafter, a process of inspecting and repairing pixel badness in a LCD panel using the present inspecting apparatus configured as mentioned above will be described. First, a LCD panel to be inspected at the loader 60 of the auto probe 50 is carried from the exterior into the interior of the auto probe 50. The LCD panel carried into the loader 60 is sent to the inspector 64 by means of the robot transporter 66. When the LCD panel is safely loaded on the inspector 64 of the auto probe 50, the pattern generator 52 generates a test pattern signal in response to a control signal applied from the pointing device 54 to apply the test pattern signal to the inspector 64 of the auto probe 50. Then, a test pattern is expressed on a screen of the LCD panel loaded on the inspector 64 of the auto probe 50. Thus, a worker observes this screen to inspect whether or not a bad pixel exists. At this time, a worker's eye senses pixel badness such as a poor color, a bright point, a dark point and a line defect, etc. At the same time, a cursor moved by an operation of the pointing device 54 is emerged on the screen of the LCD panel, and X-Y co-ordinates of the cursor are displayed at the edge portion of the screen. The worker grasps a position of the bad pixel and then operates the pointing device 54 to move a position of the cursor into the position of the bad pixel. The pointing device 54 is a mouse connected to the pattern generator 52 by a user interface, which permits a worker to freely move a position of the cursor. The pointing device 54 permits a movement of the cursor in all the direction unlike the conventional manual operation box 24 capable of moving the cursor only in the up, down, left and right direction, so that a worker can rapidly move the cursor into a position of a bad pixel. Furthermore, an accurate co-ordinate acquisition work may be performed by virtue of a cursor operation button provided in a manual operation box 68 so as to make a fine position control of the cursor moved into a position of a bad pixel rapidly. When the cursor is moved into that position of the bad pixel by an operation of the pointing device 54, X-Y co-ordinates of the bad pixel are displayed at the edge portion of the screen. At this time, if a worker clicks the button provided in the pointing device 54, a co-ordinate value data of the bad pixel is transmitted to and stored in the file server 56 interfaced with the pointing device 54. Also, an identification (ID) number of the inspected LCD panel is stored in the file server 56. Such a work is repeated until co-ordinate values of all the bad pixels have been known.

Since the conventional inspecting apparatus must move the cursor into a position of the bad pixel pushing the cursor operation button of the manual operation box 24 hundreds of times, a co-ordinate acquisition work required about 1 to 2 minutes per LCD panel. Otherwise, the present inspecting apparatus moves the cursor using the mouse, so that it takes only 20 to 30 seconds per LCD panel in acquiring co-ordinate values of the bad pixel. Accordingly, a required inspection time is dramatically shortened to be expected to improve the productivity. Also, the co-ordinate value data is automatically stored in the file server 56 interfaced with the pointing device 54 without allowing a worker to write the co-ordinate values of the bad pixel on the work paper, so that work efficiency can be improved. After all the co-ordinate value data of the bad pixels were stored in the file server 56, the LCD panel loaded on the inspector 64 is transported into the unloader 62 by means of the robot transporter 62 and then carried from the unloader 62 into the exterior of the auto probe 50. Subsequently, a LCD panel being subject to the next inspection is carried to the loader 60 of the auto probe 50. A LCD panel in which bad pixels have been found in the inspecting process is sent to the laser-repairing device 58 to perform a repairing work for the bad pixels. At this time, the laser-repairing device 58 interfaced with the file server 56 automatically receives an ID number of the inspected LCD panel and a co-ordinate value data of the bad pixel from the file server 56. In the laser repairing device 58, the laser beam generator is automatically moved into the corresponding co-ordinates of the LCD panel in accordance with the transmitted co-ordinate value data and emits a laser beam to the corresponding bad pixel, thereby performing a repair work of the liquid crystal cell. The repairing work for the liquid crystal cell employs a method of shorting TFT's of the liquid crystal cell by a laser beam to make a bright point of the corresponding cell, or of opening the electrodes to make a dark point of the corresponding cell.

As described above, according to the present cell badness inspecting apparatus for the liquid crystal display device, co-ordinate values of the bad pixel are rapidly acquired by virtue of the pointing device 54 capable of freely moving the cursor emerging on the screen of the LCD panel. The acquired co-ordinate value is automatically transmitted to and stored in the file server 56 interfaced with the pointing device 54, and the stored data is transmitted to the laser repairing device 58 during the later repair work for the bad pixel to make an automatic repair work. Accordingly, a faster inspection than the prior art can be not only made, but also an efficiency of the inspection work can be improved. Moreover, the co-ordinate value data of the bad pixels is automatically transmitted to the laser repairing device 58 to make an automatic repair work rather than allowing a worker to perform a repair work seeing the data written on the work paper, so that an error generation in the repair work can be prevented to improve a yield of the repair work.

Although the present invention has been explained by the embodiments shown in the drawings described above, it should be understood to the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

What is claimed is:

1. An inspecting apparatus for inspecting cell badness in a liquid crystal display device comprising:

an auto probe loading a liquid crystal display panel;

a pattern generator applying a test pattern signal on a screen of the liquid crystal display panel;

a pointing device moving a cursor emerging on the screen of the liquid crystal display panel in all the direction to co-ordinate values of bad pixels; and a data storage device storing the co-ordinate values of the bad pixels by the pointing device.

2. The apparatus as claimed in claim 1, wherein the auto probe includes a loader, an unloader, and an inspector.

3. The apparatus as claimed in claim 2, wherein the inspector is interfaced with the pointing device.

4. The apparatus as claimed in claim 1, wherein the pointing device is interfaced with the pattern generator.

5. The apparatus as claimed in claim 1, wherein the data storage device stores the co-ordinate values of the bad pixels and an identification number of the inspected liquid crystal display panel and transmits to a liquid crystal display panel repairing device.

6. The apparatus as claimed in claim 5, wherein the liquid crystal display panel repairing device includes a laser-repairing device.

7. The apparatus as claimed in claim 1, wherein the data storage device is interfaced with the liquid crystal display panel repairing device.

8. A method of inspecting cell badness in a liquid crystal display comprising the steps of:

loading a liquid crystal display panel on an auto probe;

applying a test pattern signal from a pattern generator on a screen of the liquid crystal display panel;

moving a cursor emerging on the screen of the liquid crystal display panel using a pointing device;

acquiring co-ordinate values of the bad pixels using the pointing device; and transmitting the co-ordinate values of the bad pixels and the identification number data stored in data storage device to repairing device for repairing the liquid crystal display panel.

9. The apparatus as claimed in claim 8, wherein the auto probe includes a loader, an unloader, and an inspector.

10. The apparatus as claimed in claim 9, wherein the inspector is interfaced with the pointing device.

11. The method as claimed in claim 8, wherein the pointing device is interfaced with the pattern generator.

12. The method as claimed in claim 8, wherein the data storage device is interface with the repairing device.

13. The method as claimed in claim 8, wherein the repairing device includes laser-repairing device.

* * * * *